United States Patent [19]

Hawkins, Jr. et al.

[11] Patent Number: 4,998,272

[45] Date of Patent: Mar. 5, 1991

[54] PERSONAL VOICE MAIL SYSTEM

[75] Inventors: James R. Hawkins, Jr., Gaithersburg; Jerry Clarke, College Park, both of Md.

[73] Assignee: Digital Voice Technologies, Inc., Md.

[21] Appl. No.: 366,452

[22] Filed: Jun. 15, 1989

[51] Int. Cl.⁵ .............................................. H04M 1/65
[52] U.S. Cl. ....................................... 379/88; 379/67; 379/69; 379/77
[58] Field of Search ...................... 379/89, 88, 67, 69, 379/77

[56] References Cited

U.S. PATENT DOCUMENTS

| | | | |
|---|---|---|---|
| 4,304,968 | 12/1981 | Klausner et al. | 379/69 |
| 4,371,752 | 2/1983 | Matthews et al. | 379/89 |
| 4,399,331 | 8/1983 | Brown et al. | 379/42 |
| 4,524,244 | 6/1985 | Faggin et al. | 379/93 |
| 4,578,540 | 3/1986 | Borg et al. | 379/40 |
| 4,585,906 | 4/1986 | Matthews et al. | 379/88 |
| 4,602,129 | 7/1986 | Matthews et al. | 379/88 |
| 4,625,081 | 11/1986 | Lotito et al. | 379/88 |
| 4,677,659 | 6/1987 | Dargan | 379/97 |
| 4,747,126 | 5/1988 | Hood et al. | 379/74 |
| 4,782,510 | 11/1988 | Szlam | 379/88 |
| 4,799,144 | 1/1989 | Parruck et al. | 364/200 |

OTHER PUBLICATIONS

"Personal Computers are Putting the Squeeze on Digital PABX Voice Mail", J. R. Lineback, *Electronics Week*, Jun. 10, 1985, pp. 28, 29.
"Applying a TM5320C17 to Voice Store-And-Forward", G. Frantz, TI Mini APP Note, Jun. 1987.
"Applied Voice Technology's Callxpress Upgrade", *Inbound/Outbound Magazine*, Jan. 1989, p. 55.

Primary Examiner—Thomas W. Brown
Attorney, Agent, or Firm—Hoffman, Wasson & Gitler

[57] ABSTRACT

A personal voice mail system adapted to be connected to a standard touch tone telephone. This system would allow a subscriber to prerecord a message to be delivered to one or more called parties at a particular time. Additionally, the system can be made secure by requiring the called party to provide a confidential code before the message is relayed.

4 Claims, 2 Drawing Sheets

PERSONAL VOICE MAIL SYSTEM

BACKGROUND OF THE INVENTION

In the past, telephone communication between two parties could only be accomplished if both parties were present at their respective telephone hand-sets. However, if the called party was not present at his hand-set, obviously, the calling party would not be able to directly communicate with the called party, or be able to leave a message. This problem has been rectified, of course, by the development and utilization of answering machines. These machines are attached to the telephone instrument and a calling party would be able to leave a message if the called party was not present or unavailable. Recent developments in computer technology have been applied to the communications industry by allowing various parties to be "tied together" utilizing personal computers, modums and telephone communication lines. The personal computers of these systems can be utilized as an electronic mail box to transmit or receive messages even if both parties are unavailable.

However, to fully utilize this electronic mail box system, each of the parties to which a particular message is to be delivered must not only be in possession of a personal computer, but this personal computer must be tied to the same system as the calling party. Furthermore, these systems are relatively impersonal and a message cannot be delivered utilizing the voice of the calling party. Additionally, if the message to be delivered is confidential there is no mechanism for insuring that the message is delivered personally to the intended called party.

Several systems have currently been developed which employ a computer to automatically deliver a verbal message to a number of parties, or to be employed in a multiple private branch exchange. These systems are described with respect to U.S. Pat. Nos. 4,371,752; 4,585,906; and 4,602,129, all issued to Matthews and 4,747,126, issued to Hood. The three patents to Matthews are directed to a digital voice mail system interconnecting multiple private branch exchanges of a subscriber with a central telephone office. These systems allow a subscriber to digitally input an audio message into a memory and have this message delivered to one or more called parties. It is important to note that these systems are designed for use in a PBX system and not specifically utilized with a single subscriber telephone line. The patent to Hood illustrates a voice mail system which employs a magnetic tape to record various messages thereon. A central processing unit is coupled to a central office simulator and a telephone circuit. The central processing unit is provided with a microprocessor and a random access memory. A voice synthesis circuit is included for providing prompting messages to the user. However, these systems are designed for use in very complex environment and are not adapted to be used with a single subscriber telephone line.

SUMMARY OF THE INVENTION

The deficiencies of the prior art are overcome by the present invention which is directed to a personal voice mail system directly connected to a subscriber's telephone. The system includes a processor, commercial off-the-shelf integrated circuit, memory chips and system and application software used to control the operation of the entire system. In operation, the name and phone number of a callee is inputted into the machine and a message is digitally recorded. The system will then automatically dial the callee's number either immediately or at a specific time and deliver the message. If the callee does not answer the telephone, the present system would re-dial at a later time. Additionally, if the message is confidential, the present system would require the callee to identify himself before the message is delivered. Furthermore, once the message is delivered, the present system could prompt the callee for a particular response.

BRIEF DESCRIPTION OF DRAWINGS

Other objects and advantages of the present invention will be apparent from the following detailed description of preferred embodiments thereof and from the attached drawings of which.

DETAILED DESCRIPTION OF THE INVENTION

Figure 1:
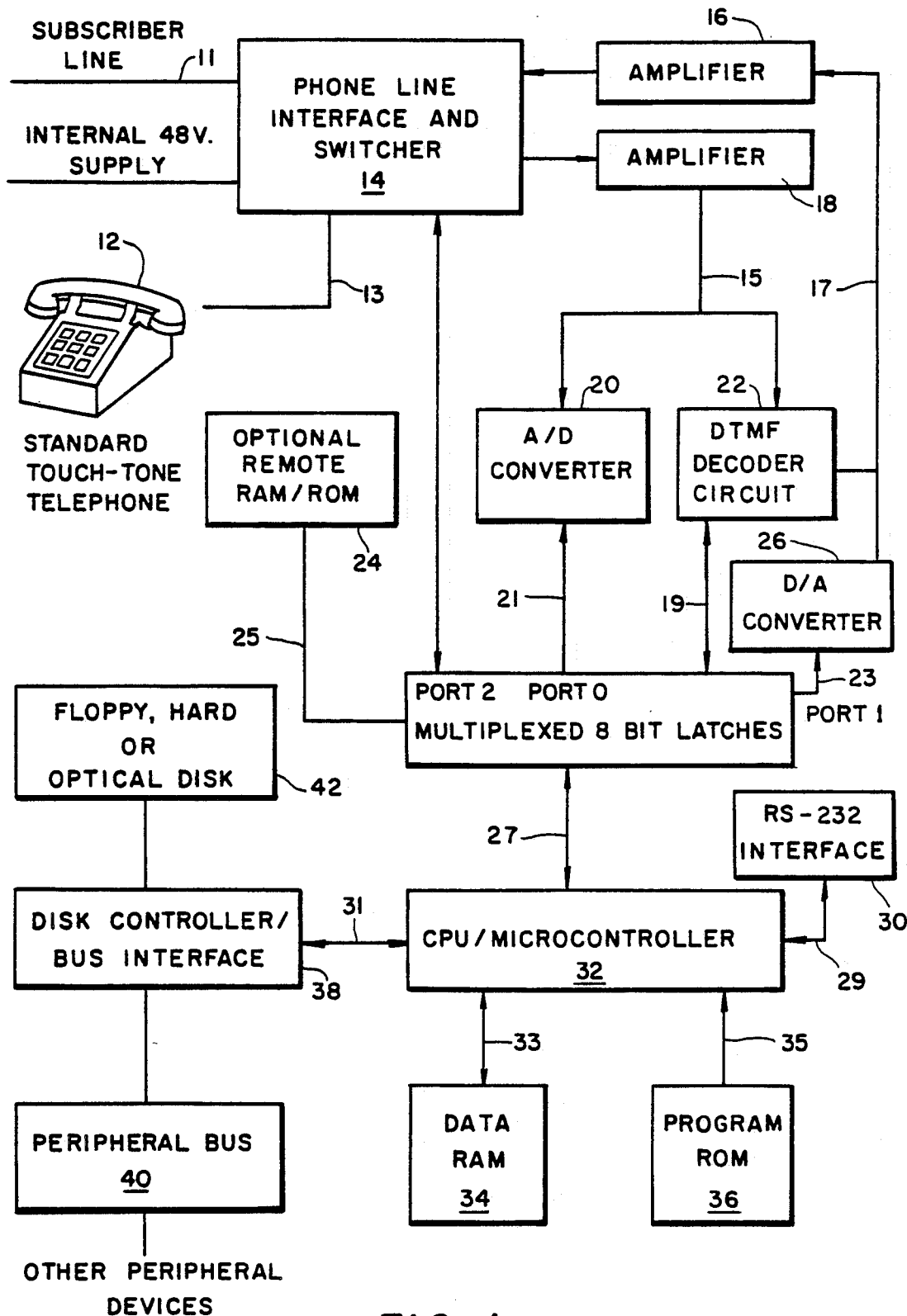
FIG. 1 is a block diagram of the personal voice mail system of the present invention.

As illustrated in FIG. 1, the personal voice mail system 10 of the present invention is designed to be connected to a standard touch tone telephone 12, this telephone connected to at least one remote telephone receiver 9 over standard telephone lines. The system 10 is also provided with a subscriber line as well as an internal −48 volt supply. Both the subscriber line 11 and the line from the telephone 12 are connected to a phone line interface and switcher circuit 14. This circuit is shown in more detail in FIG. 2 and consists of line switches 44, a two to four wire conversion circuit 46, a ring indicator (not shown) and a telephone bypass 48. The phone line interface is connected to a pair of amplifiers 16, 18 for amplifying outgoing and incoming signals, respectively. Incoming amplifier 18 is connected to an analog to digital (A/D) converter 20 and a dual tone multiple frequency (DTMF) circuit 22 via line 15. The DTMF circuit 22 as well as a digital to analog (D/A) converter 26 are connected through line 17 to the outgoing amplifier 16. The DTMF decoder circuit 22 as well as the A/D and D/A converters 20, 26 are selected through the use of a multiplexed 8-bit latching circuit 28 through lines 19, 21 and 23, respectively.

The multiplexed latching circuit 28 is controlled through the use of a central processing/controlling circuit (CPCC) including a CPU 32 through the use of communications line 27. The CPU is associated with a data random access memory (RAM) 34, as well as a program read-only memory (ROM) 36. An RS-232 interface 30 is connected to the CPU 32 via line 29. This interface can be used to lock or accept data to various peripheral devices such as a printer, an additional terminal or a computer. The internal timers provided in the CPCC are used to determine the time of day, day of year, etc., in addition to supplying the timing used for the various converters. A disc controller/bus interface 38 is connected to the CPCC by a line 31. The bus interface is provided with a peripheral bus 40 as well as an external storage device such as a floppy disc, a hard disc, and magnetic, optical or magneto-optical storage devices 42. The external storage device can be replaced by an optional remote RAM/ROM 24 connected to the multiplexed latching circuit 28 via line 25.

Figure 2:
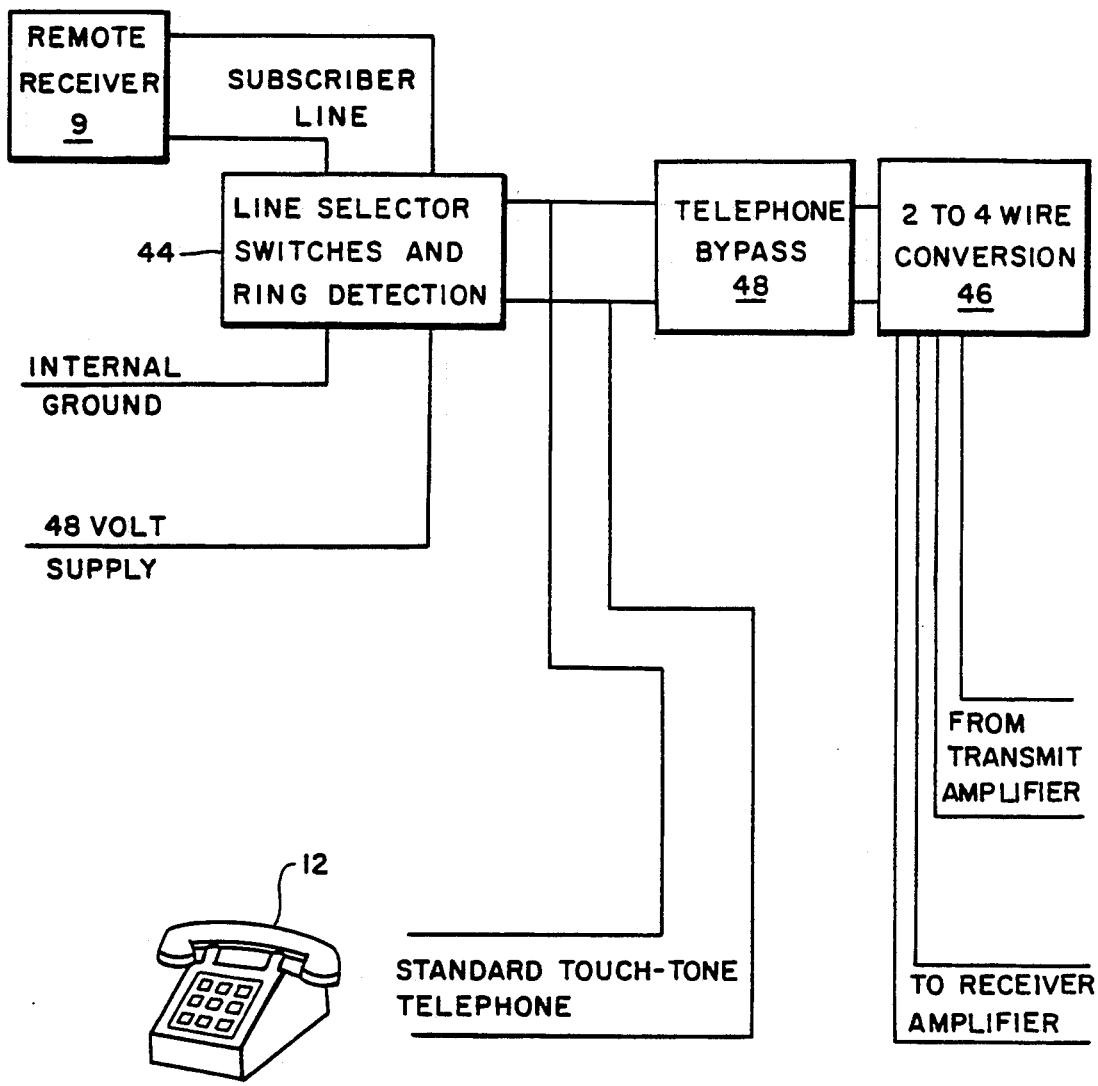
FIG. 2 is a block diagram of the phone line interface and switcher circuit shown in FIG. 1 including the touch tone telephone and remote receiver.

Shown in more detail in FIG. 2, the line selector switches 44 are provided between the subscriber's line as well as the selected lines included in the personal voice mail system. These selected lines connect the telephone bypass 48 between switches 44 and standard telephone 12 as well as a two to four wire conversion and ring detection unit 46 between the switches 44 and the amplifiers 16 and 18. It is noted that these switches are opto-isolated and are used to select either the normal subscriber line or the internal −48 volt supply. Generally, the normal subscriber line mode will be utilized until the subscriber enters an activation code on the key pad of telephone 12. Once the activation code is entered, the internal −48 volt supply will power the telephone while both a verbal or digitized message is entered into the system. At this point, the two to four wire conversion unit will convert the standard two wire subscriber line into a four wire line including a transmission pair and a receive pair. The receive pair is connected to the A/D converter 20 and the DTMF decode circuit 22 via amplifier 18. The input amplifier 18 is provided with low pass filters on both input and output in order to reduce static during voice digitation and to insure that the noise ratio is in the acceptance range of the DTMF decoder. The transmission pair is connected to the D/A converter and dialing circuit through amplifier 16. The input of this amplifier 16 is filtered to reduce internal noise from being placed on the subscriber line.

Normally, the telephone bypass circuit 48 is open allowing the telephone 12 to break the subscriber line loop when not in use. However, when the personal voice mail system (PVMS) initiates a call, or when the ring indicator signals an incoming call, the telephone bypass closes and cuts the telephone out of the loop.

Since one of the purposes of the present invention is to record messages to be transmitted by the PVMS to various callees, as well as to receive a message from the subscriber to be transmitted to various callees, and to receive return messages from these callees, A/D as well as D/A converters 20 and 26 are needed to convert the voice messages into a digital signal as well as transforming the digitized signal into an analog signal for transmission. Both of these converters are set to a timer included in the CPCC unit 32. Additionally, both of these converters are designed to operate on a scheme including 8-bit words. The digitized messages are recorded either on the external media 42 or an optional remote RAM/ROM 24.

The primary function of the DTMF decoder circuit 22 is to detect the 12-DTMF codes that correspond to the twelve keys on a standard key pad to convert them to a 4-bit nibble. These nibbles are read by the CPCC at specific times during the normal sequence of operations. Additionally, this converter monitors a call initiated by the PVMS to determine whether a dial tone, busy signal or disconnection of the circuit has occurred. Based upon the particular parameter which has been sensed, the DTMF would allow the PVMS to either initiate a call, or to indicate that it would be impossible to complete the call and the call should be attempted at a later time. Additionally, the DTMF decoder circuit is given the assignment of dialing a particular number in conjunction with the CPCC 32. Once it has been determined that the PVMS should initiate a call, the CPCC 32 would present the DTMF circuit 22 with a 4-bit number to dial. This number is converted to a DTMF tone and transmitted to the output amplifier 16. Based upon the particular software program included in the CPCC 32, the gain of input signal to the decoder 22 is determined dependent upon whether the DTMF tones are being generated by telephone 12 or are coming across the subscriber line.

As indicated hereinabove, the DTMF decoder circuit 22 as well as the A/D and D/A converters 20 and 26 are selected through the use of the multiplexed 8-bit latching circuit 28 which can included an 8255A manufactured by Intel chip appearing as four consecutive addresses to the CPCC 32. The addresses correspond to one control port (not shown) as well as the three 8-bit IO ports shown in FIG. 1.

The CPCC 32 including the CPU associated with data RAM 34 as well as program ROM 36. When power is applied to the system, the instructions stored in ROM 36 are executed by the CPCC. The RAM is applied to store internal variables and to buffer the data to and from the magnetic/optical storage device 42.

The CPCC 32 also interfaces with an external peripheral bus 40 such as a small computer system interface (SCSI). The external storage device 42 is attached through the bus and message buffers provided therein are stored and retrieved from the CPCC 32 by way of the bus interface 38. The bus can support single or multiple storage devices or other compatible peripheral devices.

Based upon the software utilized by the present system, the PVMS can answer and originate phone calls over normal subscriber lines. Additionally, through digitized voice instruction, the PVMS can prompt the user as well as decode a user's response provided through a standard touch tone keypad. These responses are stored and retrieved as needed in an external storage device or in an external memory. For example, assuming the device is activated, a subscriber can enter the time a particular message is to be relayed as well as the callee's name and number. Once this is accomplished, a message can be left for the callee and this message will be forwarded to the callee either immediately or at the time specified by the subscriber. Furthermore, if the message is to be confidential, the callee must enter a particular password before the recorded message is relayed to this callee. Furthermore, based on the software utilized, the subscriber can enter a forwarding telephone number where he can be reached.

Additionally, based upon the particular program utilized, a subscriber may re-enter incorrect responses, check the status of the message relayed, dial into the PVMS to originate message as well as additional security codes or messages.

Additionally, the PVMs can be operated either locally or remotely using a standard touch tone telephone; therefore, if given a separate line in an office, several people can use the system each having their own separate account for greetings, outgoing messages, table of passwords, etc.

Although the preferred embodiment has been described in detail, it should be understood that various changes, substitutions and alterations can be made therein without departing from the spirit and scope of the present invention as defined in the appended claims. For example, the PVMS can be utilized as a standard answering machine by recording an automatic answer greeting and allowing the message to be recorded by the calling party onto the external memory or the external storage device.

What is claimed is:

1. A personal voice mail system connected to a single subscriber touch tone telephone for storing and relaying voice messages to and from the touch tone telephone onto telephone lines to a remote receiver or receivers comprising:
    a digital memory means for storing voice messages to be relayed over the telephone lines and for storing messages received from the telephone lines, said digital memory means including a means for prompting the input of information into said digital memory means;
    a phone line interface circuit connected to the touch tone telephone;
    multiplexed latches and central processing and control circuit (CPCC) provided between said digital memory means and said phone line interface circuit;
    an analog to digital converter provided between said phone line interface circuit and said multiplexed latches and CPCC;
    a DTMF decoder circuit provided between said phone line interface circuit and said multiplexed latches and CPCC;
    said digital memory means, said multiplexed latches and CPCC and said DTMF decoder circuit act in concert to automatically relay messages to the remote receiver or receivers immediately after said messages are stored, at a predetermined time after said messages are stored or until the messages are delivered based upon monitoring of the progress of the delivery of said messages by said DTMF decoder circuit;
    wherein voice information inputted into said digital memory means is relayed over the telephone lines to one or more remote telephone receivers at a particular time, and further, wherein said digital memory means is capable of storing a response from the remote telephone receiver or receivers responsive to the voice information transmitted to the remote telephone receiver or receivers.

2. The personal voice mail system in accordance with claim 1, further including a means for storing a password of a called party, said storing means including a means for comparing a stored password with a password relayed to the personal voice mail system and communicating voice messages provided in said digital memory means only if said passwords match.

3. A personal voice mail system for relaying voice messages to and from standard telephone lines comprising:
    a touch tone telephone;
    a digital memory means for storing voice messages to be relayed over the telephone lines and for storing messages received from the telephone lines, said digital memory means including a means for prompting the input of information into said digital memory means;
    a phone line interface circuit connected to said touch tone telephone;
    multiplexed latches and central processing and control circuit (CPCC) provided between said digital memory means and said phone line interface circuit;
    an analog to digital converter provided between said phone line interface circuit and said multiplexed latches and CPCC;
    a digital to analog converter provided between said phone line interface circuit and said multiplexed latches and CPCC; and
    a DTMF decoder circuit provided between said phone line interface circuit and said multiplexed latches and CPCC;
    said digital memory means, said multiplexed latches and CPCC and said DTMF decoder circuit act in concert to automatically relay messages to the remote receiver or receivers immediately after said messages are stored, at a predetermined time after said messages are stored or until the messages are delivered based upon monitoring of the progress of the delivery of said messages by said DTMF decoder circuit;
    wherein voice information inputted into said digital memory means is relayed over the telephone lines to one or more remote telephone receivers at a particular time, and further, wherein said digital memory means is capable of storing a response from the remote telephone receiver or receivers responsive to the voice information transmitted to the remote telephone receiver or receivers.

4. The personal voice mail system in accordance with claim 3, further including a means for storing a password of a called party, said storing means including a means for comparing a stored password with a password relayed to the personal voice mail system and communicating voice messages provided in said digital memory means only if said passwords match.

* * * * *